US012343998B2

(12) United States Patent
Tsuda et al.

(10) Patent No.: US 12,343,998 B2
(45) Date of Patent: Jul. 1, 2025

(54) LIQUID DISCHARGE APPARATUS

(71) Applicants: Masaaki Tsuda, Kanagawa (JP); Norikazu Yanase, Kanagawa (JP)

(72) Inventors: Masaaki Tsuda, Kanagawa (JP); Norikazu Yanase, Kanagawa (JP)

(73) Assignee: RICOH COMPANY, LTD., Tokyo (JP)

(*) Notice: Subject to any disclaimer, the term of this patent is extended or adjusted under 35 U.S.C. 154(b) by 77 days.

(21) Appl. No.: 18/367,487

(22) Filed: Sep. 13, 2023

(65) Prior Publication Data

US 2024/0100841 A1 Mar. 28, 2024

(30) Foreign Application Priority Data

Sep. 28, 2022 (JP) ................................ 2022-155233

(51) Int. Cl.
*B41J 2/17* (2006.01)
*B41J 29/13* (2006.01)

(52) U.S. Cl.
CPC ............ *B41J 2/1714* (2013.01); *B41J 29/13* (2013.01)

(58) Field of Classification Search
CPC .. B41J 2/185; B41J 2/1714; B41J 2002/1853; B41J 29/13
See application file for complete search history.

(56) References Cited

U.S. PATENT DOCUMENTS 8,556,374 B2 10/2013 Gras et al.
2014/0078232 A1 3/2014 Kondo et al.
2014/0097288 A1 4/2014 Yanase et al.
2014/0099148 A1 4/2014 Obata et al.
2014/0099149 A1 4/2014 Kikura et al.
2014/0099150 A1 4/2014 Matsumoto et al.
2014/0105661 A1 4/2014 Kondo et al.
(Continued)

FOREIGN PATENT DOCUMENTS

CN 205705787 U * 11/2016
EP 3 970 979 A1 3/2022
(Continued)

OTHER PUBLICATIONS

Hu, Machine TranslationofCN-205705787-U, 2016 (Year: 2016).*
Tachibana, Machine TranslationofJP-2011189702-A, 2011 (Year: 2011).*
Extended European Search Report issued Feb. 2, 2024 in European Patent Application No. 23197837.0, 8 pages.

*Primary Examiner* — Scott A Richmond
(74) *Attorney, Agent, or Firm* — XSENSUS LLP

(57) ABSTRACT

A liquid discharge apparatus includes a first liquid discharge unit including a first liquid discharge head that moves in a main scanning direction to discharge a liquid onto a recording medium conveyed in a conveyance direction orthogonal to the main scanning direction, a second liquid discharge unit at a different position with the first liquid discharge unit in the conveyance direction and including a second liquid discharge head that moves in the main scanning direction parallel to the first liquid discharge head to discharge a liquid onto the recording medium, a first airflow generator between the first liquid discharge unit and the second liquid discharge unit in the conveyance direction to generate an airflow flowing in the main scanning direction, and a partition plate between the first airflow generator and the second liquid discharge unit in the conveyance direction.

10 Claims, 4 Drawing Sheets

(56) References Cited

U.S. PATENT DOCUMENTS

| | | | |
|---|---|---|---|
| 2014/0253623 | A1 | 9/2014 | Nakano et al. |
| 2015/0054898 | A1 | 2/2015 | Kondo et al. |
| 2015/0077459 | A1 | 3/2015 | Yanase et al. |
| 2015/0077494 | A1 | 3/2015 | Obata et al. |
| 2015/0091971 | A1 | 4/2015 | Matsumoto et al. |
| 2016/0031239 | A1 | 2/2016 | Yanase et al. |
| 2018/0001669 | A1 | 1/2018 | Furukawa et al. |
| 2018/0313033 | A1 | 11/2018 | Yanase et al. |
| 2019/0009586 | A1 | 1/2019 | Yanase et al. |
| 2019/0283446 | A1 | 9/2019 | Tsuda |
| 2021/0138791 | A1 | 5/2021 | Fukui et al. |
| 2021/0237467 | A1 | 8/2021 | Kemma et al. |
| 2021/0283914 | A1 | 9/2021 | Yanase |
| 2022/0055386 | A1 | 2/2022 | Yanase et al. |
| 2022/0234374 | A1* | 7/2022 | Park ....................... B41J 25/006 |
| 2023/0109593 | A1 | 4/2023 | Yanase |
| 2023/0241884 | A1 | 8/2023 | Yanase |

FOREIGN PATENT DOCUMENTS

| | | | | | |
|---|---|---|---|---|---|
| JP | 2002-307725 | A | | 10/2002 | |
| JP | 2006-076155 | A | | 3/2006 | |
| JP | 2006-088468 | A | | 4/2006 | |
| JP | 2009-119704 | A | | 6/2009 | |
| JP | 2011189702 | A | * | 9/2011 | ............ B41J 19/202 |
| JP | 2021-123103 | A | | 8/2021 | |

* cited by examiner

LIQUID DISCHARGE APPARATUS

CROSS-REFERENCE TO RELATED APPLICATION

This patent application is based on and claims priority pursuant to 35 U.S.C. § 119(a) to Japanese Patent Application No. 2022-155233, filed on Sep. 28, 2022, in the Japan Patent Office, the entire disclosure of which is hereby incorporated by reference herein.

BACKGROUND

Technical Field

Embodiments of the present disclosure relate to a liquid discharge apparatus.

Related Art

In a liquid discharge apparatus that discharges ink as a liquid, in addition to droplets of the ink discharged from a liquid discharge head to form an image, mist of the ink (i.e., ink mist) smaller than the droplets is generated, which may cause deterioration in image quality and may stain an interior of the liquid discharge apparatus.

For example, the liquid discharge apparatus includes an ink mist collection unit including a fan, a suction duct, and an exhaust duct to generate an airflow circulating in the liquid discharge apparatus. The ink mist generated from the liquid discharge head is collected by the circulating airflow to prevent the deterioration in image quality and the stain in the liquid discharge apparatus.

SUMMARY

Embodiments of the present disclosure describe an improved liquid discharge apparatus that includes a first liquid discharge unit, a second liquid discharge unit, a first airflow generator, and a partition plate. The first liquid discharge unit includes a first liquid discharge head that moves in a main scanning direction to discharge a liquid onto a recording medium conveyed in a conveyance direction orthogonal to the main scanning direction. The second liquid discharge unit is disposed at a different position with the first liquid discharge unit in the conveyance direction. The second liquid discharge unit includes a second liquid discharge head that moves in the main scanning direction parallel to the first liquid discharge unit to discharge a liquid onto the recording medium. The first airflow generator is disposed between the first liquid discharge unit and the second liquid discharge unit in the conveyance direction. The first airflow generator generates an airflow flowing in the main scanning direction. The partition plate is disposed between the first airflow generator and the second liquid discharge unit in the conveyance direction.

BRIEF DESCRIPTION OF THE DRAWINGS

A more complete appreciation of the disclosure and many of the attendant advantages and features thereof can be readily obtained and understood from the following detailed description with reference to the accompanying drawings, wherein.

Figure 1:
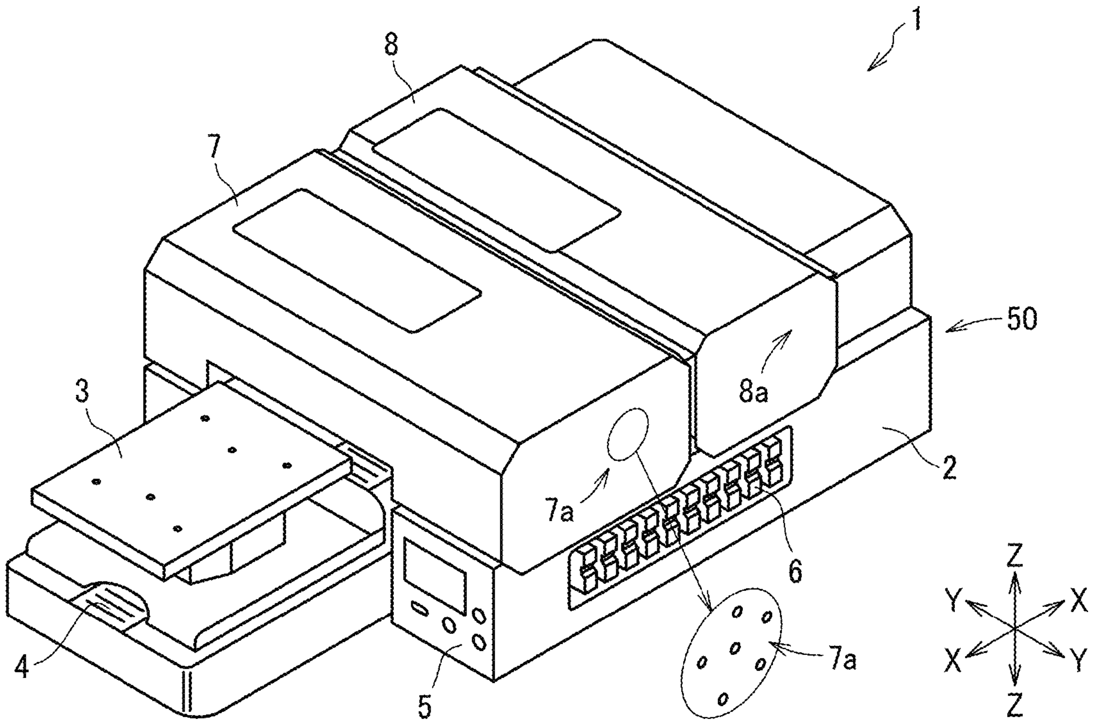
FIG. 1 is a perspective view of a liquid discharge apparatus according to an embodiment of the present disclosure, with covers closed.

The accompanying drawings are intended to depict embodiments of the present invention and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring now to the drawings, embodiments of the present disclosure are described below. As used herein, the singular forms "a," "an," and "the" are intended to include the plural forms as well, unless the context clearly indicates otherwise.

Embodiments of the present disclosure are described below with reference to the drawings. In the drawings, like reference signs denote like elements, and overlapping description may be simplified or omitted as appropriate.

Figure 2:
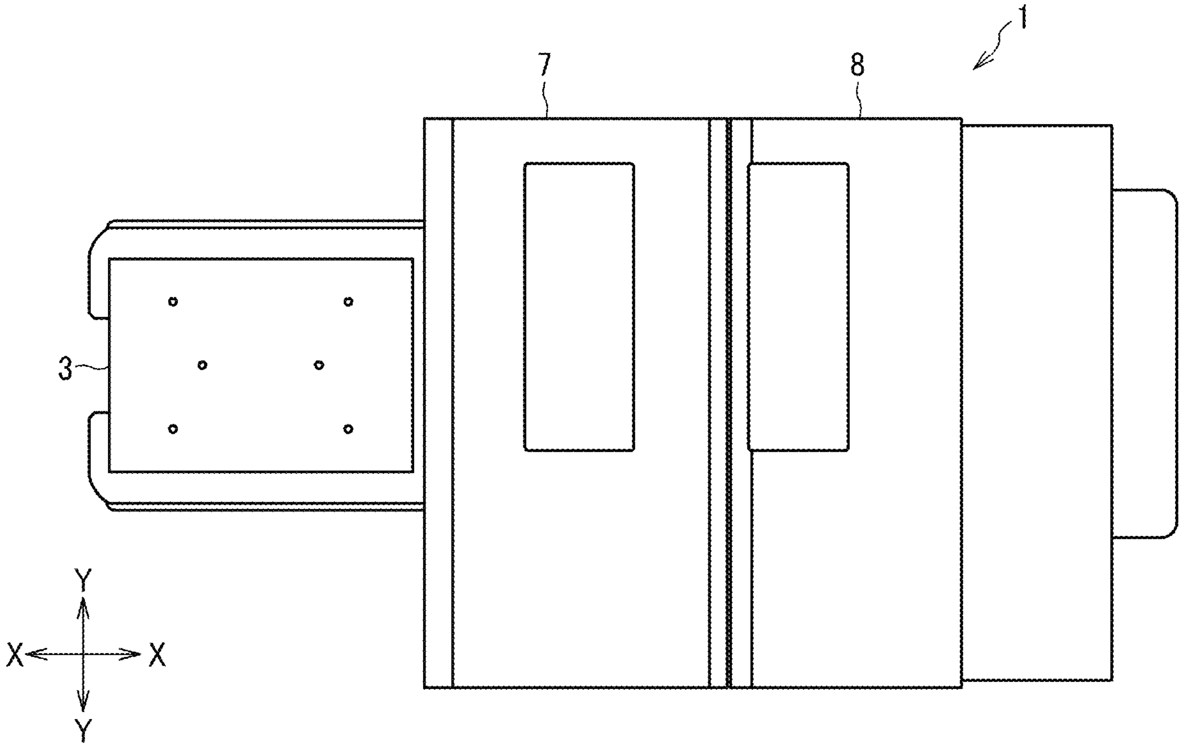
FIG. 2 is a plan view of the liquid discharge apparatus illustrated in FIG. 1.
Figure 3:
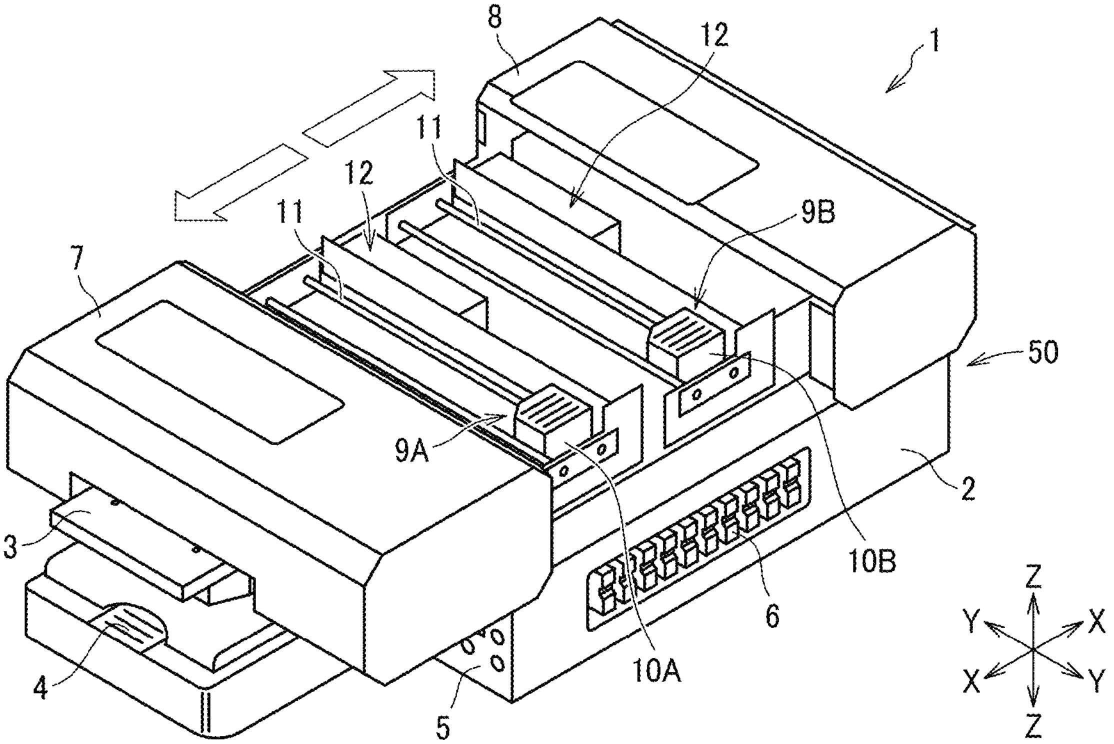
FIG. 3 is a perspective view of the liquid discharge apparatus of FIG. 1 with the covers open.
Figure 4:
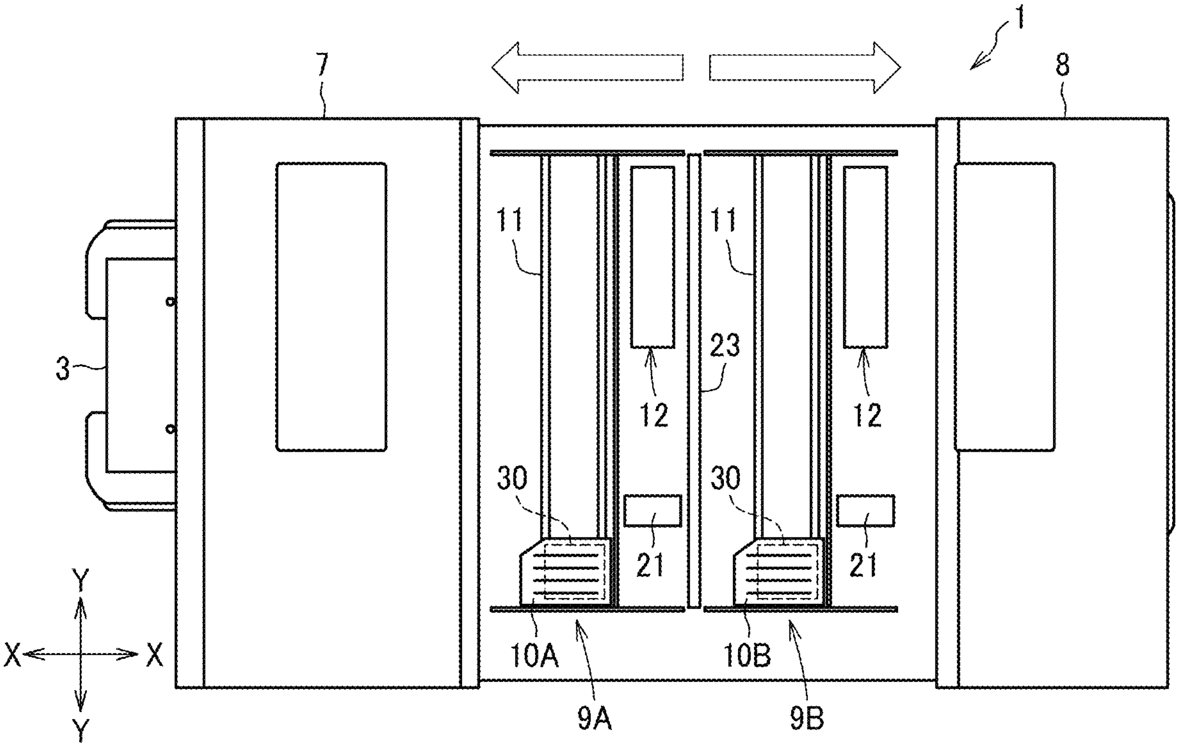
FIG. 4 is a plan view of the liquid discharge apparatus illustrated in FIG. 3.

FIG. 1 is a perspective view of a liquid discharge apparatus 1 according to an embodiment of the present disclosure, with covers closed, and FIG. 2 is a plan view thereof. FIG. 3 is a perspective view of the liquid discharge apparatus 1 with the covers open, and FIG. 4 is a plan view thereof. X directions in FIG. 1 are a front-rear direction, a sub-scanning direction, and a recording medium conveyance direction of the liquid discharge apparatus 1. Y directions in FIG. 1 are a transverse direction and a main scanning direction of the liquid discharge apparatus 1. Z directions in FIG. 1 are a vertical direction. The X directions and the Y directions are parallel to a surface, onto which a liquid is discharged, of a recording medium on a stage 3 but may have some error. The X, Y, and Z directions are orthogonal to each other. In FIG. 3, a partition plate 231 (see FIG. 6), which is described later, is omitted for the sake of convenience.

As illustrated in FIGS. 1 and 2, the liquid discharge apparatus 1 includes the stage 3 in front of a housing 2. The stage 3 is mounted on a guide rail 4. The guide rail 4 extends in the X directions. A control panel 5 is disposed on a front face of the housing 2. An ink cartridge 6 is detachably attached to a side face of the housing 2. A front cover 7 and a rear cover 8 as an opening-and-closing cover are disposed over the housing 2.

The stage 3 has a flat upper face on which the recording medium is placed. The upper face of the stage 3 is parallel to the X directions and the Y directions. The stage 3 moves on the guide rail 4 to reciprocate in both the X directions. The stage 3 is movable up and down in the Z directions. Thus, the height of the recording medium placed on the stage 3 is adjustable.

The front cover 7 and the rear cover 8 are movable in both the X directions. In FIG. 1, the front cover 7 has been moved backward and the rear cover 8 has been moved forward to close the front cover 7 and the rear cover 8. On the other hand, in FIG. 3, the front cover 7 is moved forward and the rear cover 8 is moved backward to open the front cover 7 and the rear cover 8. As described above, the front cover 7 and the rear cover 8 are slidably opened and closed, thereby reducing an occupied space of the liquid discharge apparatus 1 including an opening and closing space of each of the front cover 7 and the rear cover 8 as compared with a configuration in which a front cover and a rear cover are opened and closed in the vertical direction. The front cover 7 and the rear cover 8 have openings at both ends in the front-rear direction. When the front cover 7 and the rear cover 8 are closed, the front cover 7 and the rear cover 8 are continuously arranged in the front-rear direction.

As illustrated in FIGS. 3 and 4, an apparatus body 50 of the liquid discharge apparatus 1 includes, for example, the housing 2 and liquid discharge units 9A and 9B mounted on the housing 2. In the present embodiment, specifically, the apparatus body 50 is a portion of the liquid discharge apparatus 1 other than the front cover 7 and the rear cover 8. The front cover 7 and the rear cover 8 are slidable in the X directions relative to the apparatus body 50.

The front cover 7 and the rear cover 8 are opened to expose the liquid discharge units 9A and 9B to the outside of the liquid discharge apparatus 1. When the liquid discharge units 9A and 9B are exposed to the outside, an operator can clean a maintenance unit 30, a liquid discharge head 20 (see FIG. 5), and the surrounding thereof, or can replace carriages 10A and 10B. The front cover 7 and the rear cover 8 are closed during image formation. As a result, the liquid discharge units 9A and 9B are covered by the front cover 7 and the rear cover 8 to block access to operation units such as the carriages 10A and 10B of the liquid discharge units 9A and 9B from the outside. The liquid discharge units 9A and 9B are disposed in the closed space in the front cover 7 or the rear cover 8. Accordingly, mist of ink (an example of a liquid) is prevented from scattering to environs outside the liquid discharge apparatus 1 while the liquid discharge head 20 discharges the ink to the recording medium (i.e., during liquid discharge operation). Further, the liquid discharge units 9A and 9B may include a fan to circulate an airflow in the front cover 7 or the rear cover 8, thereby collecting the generated mist of the ink in the front cover 7 or the rear cover 8.

The liquid discharge apparatus 1 according to the present embodiment includes the two liquid discharge units 9A and 9B arranged side by side in the X directions (i.e., in parallel to each other at a different position in the conveyance direction). The liquid discharge unit 9A (i.e., a first liquid discharge unit) discharges color ink and white ink. The liquid discharge unit 9B (i.e., a second liquid discharge unit) discharges a pretreatment liquid. The liquid discharged by each of the liquid discharge units 9A and 9B is not limited to the above example, and any liquid of the color ink, the white ink, and the pretreatment liquid may be discharged by each of the liquid discharge units 9A and 9B. In particular, when the recording medium is a fabric, the pretreatment liquid is preferably applied to the recording medium before the image formation using the ink. In other words, one of the liquid discharge units 9A and 9B preferably discharges the pretreatment liquid.

Since the liquid discharge units 9A and 9B have similar configurations, the liquid discharge unit 9A is described below. The liquid discharge unit 9A includes the carriage 10A, a guide rod 11, an electrical component unit 12, and the maintenance unit 30. The liquid discharge units 9A and 9B and the carriages 10A and 10B are also referred to simply as a liquid discharge unit 9 and a carriage 10, respectively, unless distinguished.

The guide rod 11 extends in the main scanning direction. The carriage 10 is movable in the main scanning direction along the guide rod 11. The carriage 10 includes multiple liquid discharge heads 20. The maintenance unit 30 is disposed at a position facing the guide rod 11 outside a liquid discharge region on one side in the transverse direction (Y directions).

The electrical component unit 12 includes, for example, a board and an electrical component cover covering the board. The electrical component unit 12 includes a control unit that controls the liquid discharge operation.

The maintenance unit 30 includes, for example, a wiping member that cleans a nozzle face of the liquid discharge head 20 and a suction mechanism that sucks the nozzle face. The wiping member may be a wiper made of, for example, rubber, or a web made of, for example, nonwoven fabric.

A process of forming an image on the recording medium by the liquid discharge head 20 is described below.

The recording medium is placed on the stage 3 and conveyed along the guide rail 4. The recording medium is conveyed to a rear side of the liquid discharge apparatus 1, and the pretreatment liquid is applied to the recording medium by the liquid discharge unit 9B. Specifically, while the carriage 10B moves in the main scanning direction along the guide rod 11, the liquid discharge unit 9B discharges the pretreatment liquid from nozzles of the liquid discharge head 20 to apply the pretreatment liquid to the entire width of the recording medium in the main scanning direction. The application of the pretreatment liquid is repeated at multiple positions in the sub-scanning direction, thereby applying the pretreatment liquid to the entire recording medium. After that, the stage 3 moves forward, and the liquid discharge unit 9A discharges the color ink of multiple colors onto the recording medium by a similar method by the liquid discharge unit 9B. When white color is printed on the recording medium, for example, the liquid discharge unit 9A discharges the white ink onto the recording medium, the stage 3 moves to the rear side of the liquid discharge unit 9A again, and the liquid discharge unit 9A discharges the color ink onto the recording medium. Thus, an image is formed on the recording medium.

As described above, in the liquid discharge apparatus 1 including the multiple liquid discharge units 9A and 9B, the liquids discharged from the respective liquid discharge units 9A and 9B may be mixed. For example, when a part of ink discharged from the liquid discharge unit 9A becomes mist (i.e., ink mist) and the ink mist scatters toward the liquid discharge unit 9B, the ink mist may be mixed with the pretreatment liquid discharged from the liquid discharge unit 9B. When different liquids (e.g., the ink and the pretreatment liquid) are mixed with each other, solidification or chemical reaction of the liquids may occur. As a result, the solidified or chemically reacted liquids may hinder functions of the liquid discharge apparatus 1 or may corrode components of the liquid discharge apparatus 1. A partition 23 that prevents liquids from being mixed between the liquid discharge units 9A and 9B, and a mechanism that generates an airflow in the liquid discharge apparatus 1 are described below with reference to FIGS. 5 to 7.

Figure 5:
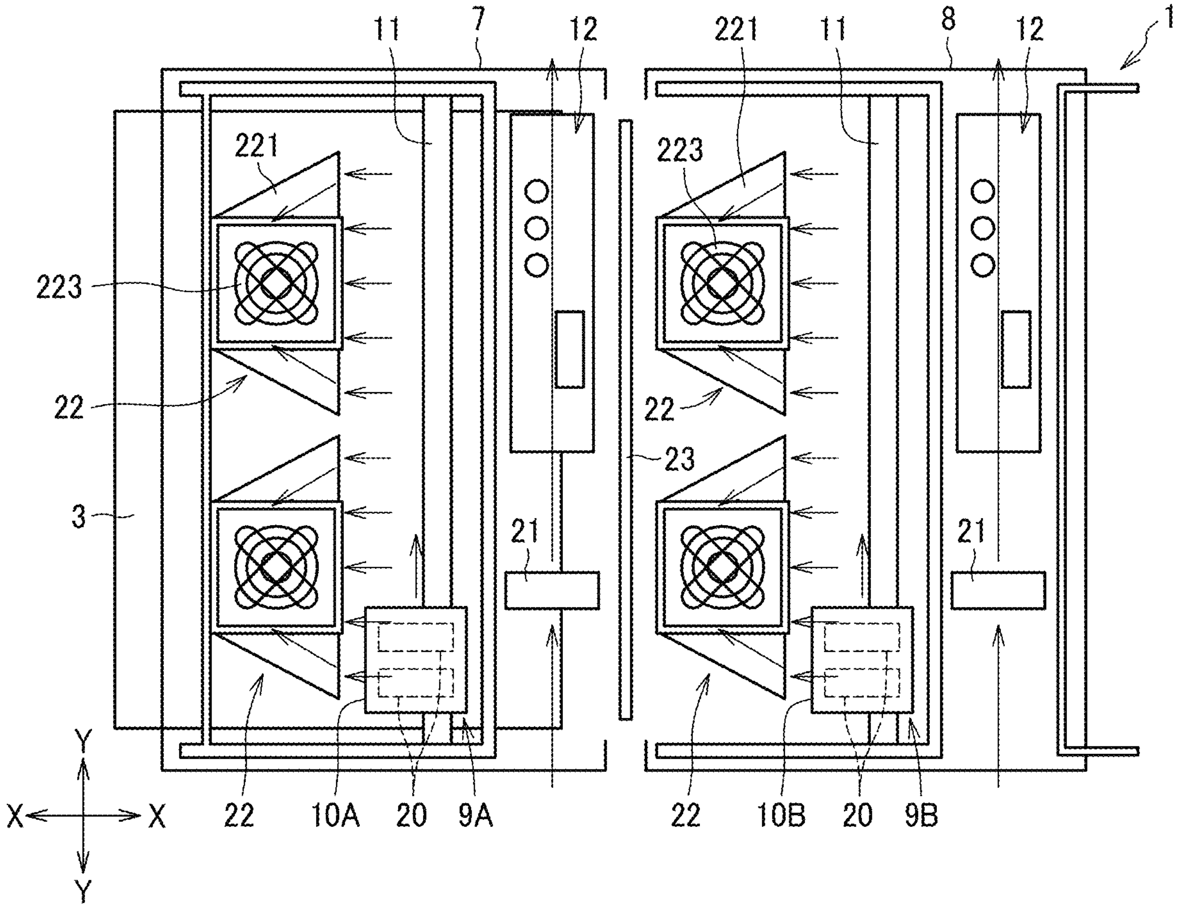
FIG. 5 is a plan view of a partition and an airflow generator inside the liquid discharge apparatus of FIG. 1.

As illustrated in FIG. 5, a first airflow generator 21 is disposed between the liquid discharge unit 9A and the liquid discharge unit 9B. Another first airflow generator 21 is disposed adjacent to (behind) the liquid discharge unit 9B. A second airflow generator 22 is disposed adjacent to (in front of) each of the liquid discharge units 9A and 9B. The liquid discharge unit 9A and the liquid discharge unit 9B described herein refer to the entire movement region where the carriages 10A and 10B are movable along the guide rod 11. The second airflow generator 22 is disposed on each of one side and the other side in the main scanning direction and opposed to the liquid discharge unit 9A or the liquid discharge unit 9B in the conveyance direction.

The first airflow generator 21 takes in air from one side and exhausts the air to the other side in the main scanning direction. In other words, the first airflow generator 21 generates an airflow flowing in the main scanning direction between the liquid discharge unit 9A and the liquid discharge unit 9B. As a result, the ink mist is prevented from scattering from one of the liquid discharge unit 9A and the liquid discharge unit 9B to the other, and the liquids (e.g., the ink and the pretreatment liquid) are prevented from being mixed between the liquid discharge unit 9A and the liquid discharge unit 9B.

Figure 6:
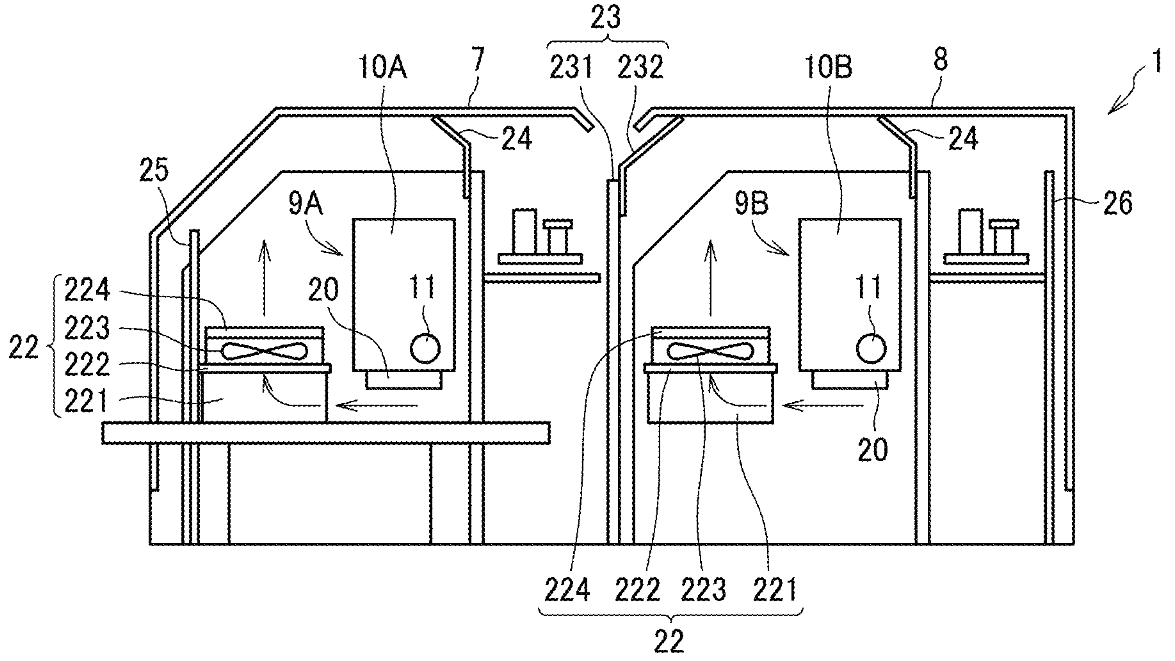
FIG. 6 is a side view of the partition and the airflow generator inside the liquid discharge apparatus of FIG. 1.

As illustrated in FIGS. 5 and 6, the second airflow generator 22 includes an intake duct 221, a filter 222, a fan 223, and an exhaust duct 224. The intake duct 221 has a shape in which the width increases toward the right side in FIG. 5 to take in air in a wide range from an intake side where the liquid discharge unit 9A or 9B is disposed. Accordingly, the collection efficiency of the ink mist by the second airflow generator 22 is increased. The filter 222 collects the ink mist in the air taken in from the intake duct 221.

As indicated by arrows in FIG. 5, the fan 223 generates an airflow flowing from the movement region of the carriage 10 (i.e., an area around the guide rod 11) toward the intake duct 221. This airflow is exhausted upward from the exhaust duct 224 through the filter 222.

Figure 7:
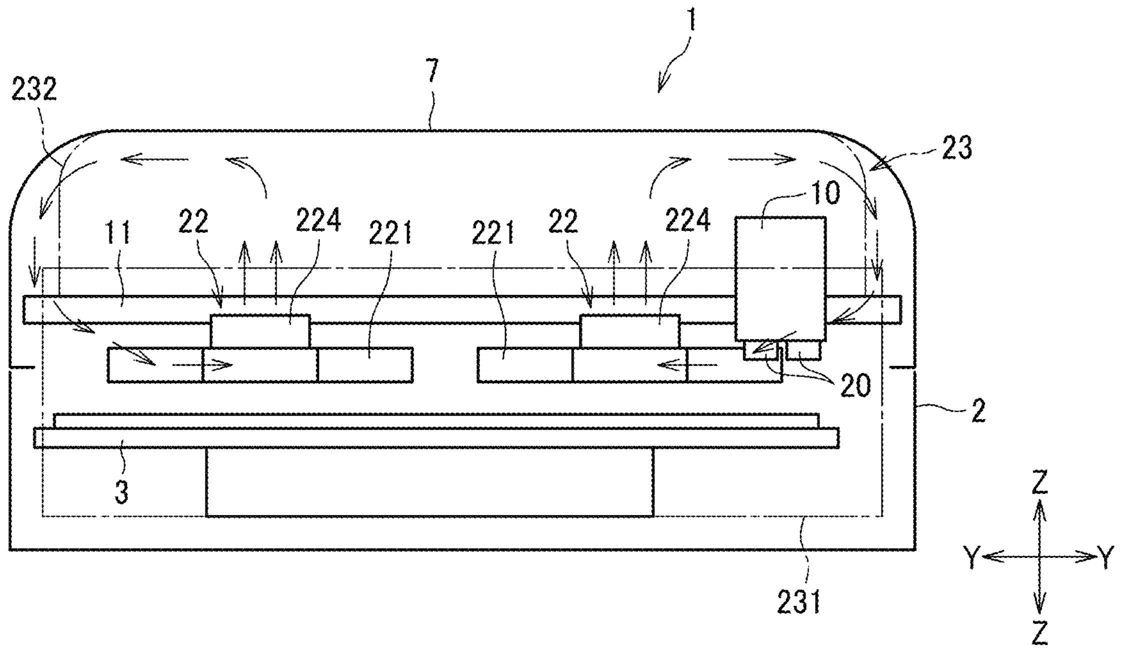
FIG. 7 is a front view of the partition and the airflow generator inside the liquid discharge apparatus of FIG. 1.

As illustrated in FIG. 7, the air exhausted from the exhaust duct 224 flows along a bottom face of a top plate and an inner face of a side plate of the front cover 7. The air flows again toward the intake duct 221 by the intake from the intake duct 221, thereby circulating the airflow in the front cover 7. The ink mist in the front cover 7 flows toward the second airflow generator 22 along with the airflow circulating in the front cover 7 and is collected by the filter 222. An airflow is similarly circulated in the rear cover 8 by the second airflow generator 22 disposed in the rear cover 8.

As illustrated in FIG. 6, a partition 23 is disposed between the first airflow generator 21 and the liquid discharge unit 9B in the conveyance direction of the recording medium. The partition 23 includes the partition plate 231 (i.e., a first partition plate) as a partition member and a film 232 (e.g., MYLAR) as an elastic sheet (elastic member). The partition plate 231 is a plate extending upward from the housing 2 (see FIG. 1) of the apparatus body 50. The film 232 such as MYLAR is a sheet made of plastic and has elasticity. The film 232 is attached to an upper portion of the partition plate 231. A first end of the film 232 is attached to the partition plate 231, and a second end of the film 232 opposite to the first end extends in a backward direction in which the rear cover 8 is opened. MYLAR (registered trademark of DuPont, terephthalic acid polyester) is an example of a resin film used as the elastic sheet, and polyester or vinyl resin can be used as the resin film, for example. Alternatively, the elastic sheet may be made of, for example, a rubber material. Similarly, the resin film or the rubber material can be used for other films which are described below.

The partition plate 231 is disposed between the liquid discharge unit 9B and the first airflow generator 21 corresponding (adjacent) to the liquid discharge unit 9A in the conveyance direction of the recording medium. Accordingly, the first airflow generator 21 and the liquid discharge unit 9B can be separated from each other. As a result, even if the ink mist discharged from the liquid discharge unit 9A scatters toward the liquid discharge unit 9B beyond the airflow in the main scanning direction generated by the first airflow generator 21, the partition 23 prevents the ink mist from scattering to the liquid discharge unit 9B and from being mixed with liquid such as the pretreatment liquid discharged from the liquid discharge unit 9B. Conversely, the partition 23 also prevents mist of the pretreatment liquid generated from the liquid discharge unit 9B from scattering to the liquid discharge unit 9A. As described above, the partition 23 prevents the liquids from being mixed between the liquid discharge units 9A and 9B.

As indicated by the alternate long and short dash line in FIG. 7, the partition plate 231 and the film 232 extend in the main scanning direction. In particular, in the present embodiment, the partition plate 231 and the film 232 are disposed along the entire liquid discharge region of the liquid discharge head 20 in the main scanning direction. Such a configuration prevents the liquids from being mixed with each other in the entire liquid discharge region where the liquid discharge head 20 discharges the liquid to the recording medium as described above. In particular, in the present embodiment, the second end of the film 232 contacts a front portion of a bottom face of a top plate of the rear cover 8. Such a configuration reduces an opening area in the rear cover 8 to the outside when the rear cover 8 is closed. As a result, the airflow is more likely to be circulated in the rear cover 8 by the second airflow generator 22, and the mist of the liquid can be more reliably collected by the second airflow generator 22. Further, the partition plate 231 and the film 232 may be disposed along the entire movement region of the carriage 10 in the main scanning direction. Thus, the partition 23 can be arranged at a position facing the maintenance unit 30 to prevent liquid scattering during maintenance of the liquid discharge head 20 of one liquid discharge unit 9 from scattering toward another liquid discharge unit 9.

The film 232, which is elastically deformable, is attached to the upper portion of the partition plate 231. Accordingly, the liquid discharge unit 9B and the first airflow generator 21 corresponding to the liquid discharge unit 9A can be separated in the entire region in the vertical direction. In other words, as illustrated in FIG. 6, the film 232 contacts the bottom face of the top plate of the rear cover 8 while being elastically deformed. Accordingly, the film 232 is disposed between the partition plate 231 and the rear cover 8 without a gap in the vertical direction. Alternatively, the partition plate 231 may extend closer to the top plate of the rear cover 8 without the film 232.

As illustrated in FIG. 7, in the present embodiment, an inner face of the front cover 7 is chamfered (rounded) at a position corresponding to a corner at which the top plate and the side plate intersect each other. In other words, R-chamfering is performed on a position corresponding to the corner formed by an upper end of the side plate of the front cover 7 and an end of the top plate of the front cover 7 in the main scanning direction. Such a configuration facilitates the airflow generated by the second airflow generator 22 flowing along the inner face of the front cover 7 from the top plate to the side plate. Thus, the airflow is likely to be circulated in the front cover 7. Similarly, the rear cover 8 is also rounded. Alternatively, C-chamfering may be performed on the position corresponding to the corner of the front cover 7, for example, and the same applies to the rear cover 8 and the film 232 which is described below. The term "be chamfered" includes C-chamfering and R-chamfering.

The second end of the film 232 is also rounded at a position corresponding to the rounded portion of the rear cover 8. In other words, R-chamfering is performed on both ends in the transverse direction of the second end of the film 232 corresponding to the corner of the rear cover 8. As a result, as viewed in the front-rear direction as illustrated in FIG. 7 (although the front cover 7 is illustrated instead of the rear cover 8 in FIG. 7), the film 232 can be disposed closer to the inner face of the rear cover 8 at a position corresponding to the corner of the rear cover 8 to reduce the gap between the inner face of the rear cover 8 and the film 232. Such a configuration further prevents the liquids from being mixed between the liquid discharge units 9A and 9B. However, in a configuration without the film 232, a portion of the partition plate 231 corresponding to the corner of the rear cover 8 may be chamfered or rounded.

One of the liquid discharge units 9A and 9B may discharge a binder or an overcoat liquid. The partition 23 according to the present embodiment prevents these liquids, the ink, and the pretreatment liquid from being mixed.

As illustrated in FIG. 6, a film 24 (e.g., MYLAR) as the elastic sheet is attached to the housing 2 of the apparatus body 50 behind each of the liquid discharge units 9A and 9B. The film 24 enhances the airtightness around each of the liquid discharge units 9A and 9B in the front cover 7 or the rear cover 8. As a result, the airflow is more likely to be circulated in each of the front cover 7 and the rear cover 8 by the second airflow generator 22, and the ink mist can be more reliably collected by the second airflow generator 22.

As illustrated in FIG. 5, the electrical component unit 12 is disposed downstream from the first airflow generator 21 in a direction of the airflow exhausted by the first airflow generator 21. Such a configuration prevents the ink mist from adhering to the electrical component unit 12 by the airflow exhausted from the first airflow generator 21.

A second partition plate 25 is disposed in front of the second airflow generator 22 corresponding to the liquid discharge unit 9A. The second partition plate 25 prevents liquid (e.g., the ink) discharged from the liquid discharge unit 9A from scattering in front of the liquid discharge apparatus 1. A third partition plate 26 is disposed behind the first airflow generator 21 corresponding to the liquid discharge unit 9B. The third partition plate 26 prevents liquid (e.g., the pretreatment liquid) discharged from the liquid discharge unit 9B from scattering behind the liquid discharge apparatus 1. In particular, when the liquid discharge apparatus 1 includes three or more liquid discharge units 9, the third partition plate 26 can prevent the liquids from being mixed between a third liquid discharge unit 9 and the liquid discharge unit 9B. As described above, the number of the liquid discharge units 9 provided in the liquid discharge apparatus 1 is not limited to two as in the present embodiment, and may be three or more.

An interior of the liquid discharge apparatus 1 communicates with the outside on the upstream side and the downstream side in the direction of the airflow generated by the first airflow generator 21. Specifically, as illustrated in FIG. 1, hole portions 7*a* and 8*a* are disposed in both side plates of the front cover 7 and the rear cover 8, respectively. As illustrated in the enlarged view in FIG. 1, each of the hole portions 7*a* and 8*a* has multiple through holes, a diameter of each of which can be set to 10 mm, for example. Accordingly, the first airflow generator 21 can generate an airflow that is taken in from the outside of the liquid discharge apparatus 1 through the multiple through holes of the side plate on an intake side of the liquid discharge apparatus 1, flows through the full width of the liquid discharge apparatus 1 in the main scanning direction, and is exhausted through the multiple through holes of the side plate on an exhaust side opposite to the intake side of the liquid discharge apparatus 1 to the outside of the liquid discharge apparatus 1. This airflow can exhaust the ink mist scattering from the liquid discharge unit 9A to the outside of the liquid discharge apparatus 1. Although the multiple through holes of the hole portion 7*a* are illustrated as an example in the enlarged view in FIG. 1, the hole portion 8*a* also has the multiple through holes. The number and arrangement of the hole portions 7*a* and 8*a* can be changed as appropriate. The hole portions 7*a* and 8*a* may not be provided in another embodiment.

In the above-described embodiment, as illustrated in FIG. 7, the airflow is circulated along the inner face on the left side in FIG. 7 or the inner face on the right side in FIG. 7 of the front cover 7 by the two second airflow generators 22 on one side and the other side in the transverse direction. In addition, a third second airflow generator 22 may be disposed between the two second airflow generators 22. As a result, the third second airflow generator 22 can generate an airflow that is taken in from the movement region of the carriage 10 in a central area in the transverse direction.

Figure 8:
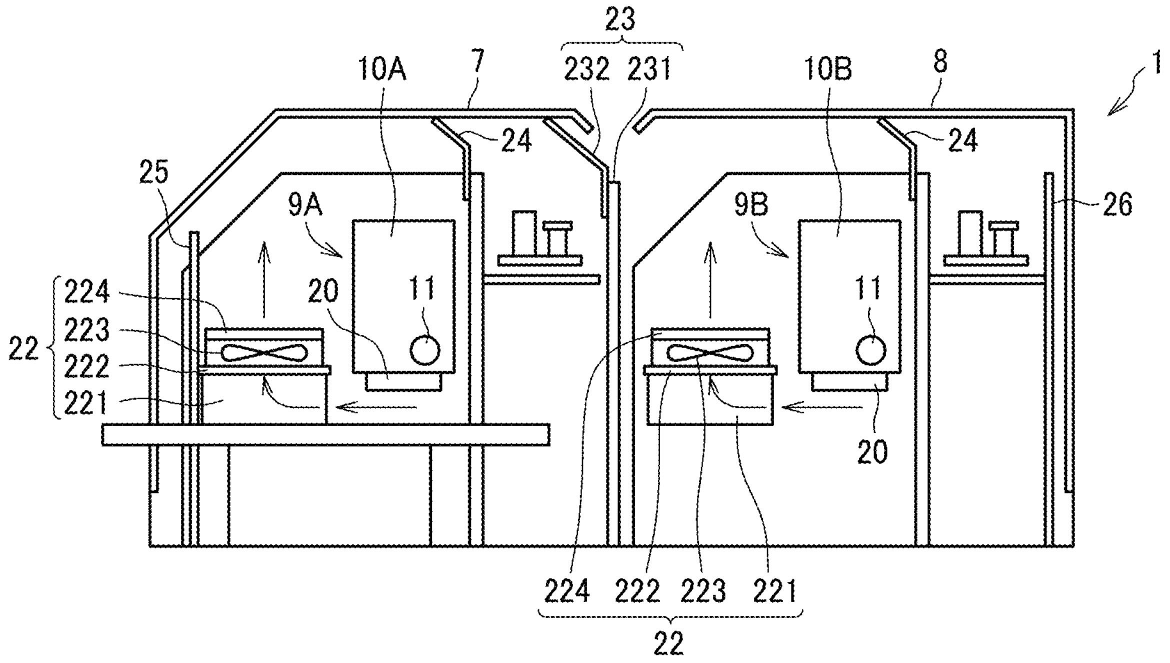
FIG. 8 is a side view of a partition according to a modification of an embodiment of the present disclosure.

As illustrated in FIG. 8, the film 232 of the partition 23 may extend toward the front cover 7 and may contact the bottom face of the top plate of the front cover 7. In this case, the partition 23 is disposed in the entire region between the apparatus body 50 and the front cover 7 in the vertical direction. Accordingly, the liquid discharge unit 9B and the first airflow generator 21 behind the liquid discharge unit 9A can be separated by the partition 23. Such a configuration prevents the liquids from being mixed between the liquid discharge units 9A and 9B.

The partition plate 231 is disposed between the front cover 7 and the rear cover 8. Thus, the partition plate 231 can be disposed so as to avoid the movement regions of the front cover 7 and the rear cover 8 to open and close the front cover 7 and the rear cover 8. The second end of the film 232 extends toward the front cover 7 or the rear cover 8, and the film 232 is disposed between the partition plate 231 and the front cover 7 or the rear cover 8 without a gap. Accordingly, the liquid discharge unit 9B and the first airflow generator 21 corresponding to the liquid discharge unit 9A can be separated by the partition 23. However, the partition plate 231 may be disposed in the front cover 7 or the rear cover 8. In this case, the partition plate 231 has a height so as not to contact the front cover 7 or the rear cover 8 which moves to be opened and closed.

The above-described embodiments are illustrative and do not limit the present disclosure. Numerous additional modifications and variations are possible in light of the above teachings. It is therefore to be understood that within the scope of the appended claims.

In the present disclosure, the liquid to be discharged is not limited to a particular liquid as long as the liquid has a viscosity or surface tension to be discharged from a head (liquid discharge head). However, preferably, the viscosity of the liquid is not greater than mPa·s under ordinary temperature and ordinary pressure or by heating or cooling. Examples of the liquid to be discharged include a solution, a suspension, or an emulsion including, for example, a solvent, such as water or an organic solvent, a colorant, such as dye or pigment, a functional material, such as a polymerizable compound, a resin, or a surfactant, a biocompatible material, such as DNA, amino acid, protein, or calcium, and an edible material, such as a natural colorant. Such a solution, a suspension, or an emulsion can be used for, e.g., inkjet ink; surface treatment liquid; a liquid for forming an electronic element component, a light-emitting element component, or an electronic circuit resist pattern; or a material solution for three-dimensional fabrication.

The term "liquid" includes not only ink but also paint, a pretreatment liquid, a binder, and an overcoat liquid.

In the present disclosure, the term "liquid discharge apparatus" includes a carriage including a liquid discharge head and drives the liquid discharge head to discharge liquid. The term "liquid discharge apparatus" used in the present disclosure includes, in addition to apparatuses to discharge liquid to a recording medium serving as materials onto which liquid can adhere, apparatuses to discharge the liquid into gas (air) or liquid.

For example, the "liquid discharge apparatus" may further include devices relating to feeding, conveying, and ejecting of the material onto which liquid can adhere and also include a pretreatment device and an aftertreatment device.

The "liquid discharge apparatus" may be, for example, an image forming apparatus to form an image on a sheet by discharging ink, or a three-dimensional fabrication apparatus to discharge fabrication liquid to a powder layer in which powder material is formed in layers to form a three-dimensional object.

The "liquid discharge apparatus" is not limited to an apparatus that discharges liquid to visualize meaningful images such as letters or figures. For example, the liquid discharge apparatus may be an apparatus that forms meaningless images such as meaningless patterns or an apparatus that fabricates three-dimensional images.

The above-described term "material onto which liquid can adhere" represents a material on which liquid is at least temporarily adhered, a material on which liquid is adhered and fixed, or a material into which liquid is adhered to permeate. Specific examples of the "material onto which liquid can adhere" include, but are not limited to, a recording medium such as a paper sheet, recording paper, a recording sheet of paper, a film, or cloth, an electronic component such as an electronic substrate or a piezoelectric element, and a medium such as layered powder, an organ model, or a testing cell. The "material onto which liquid can adhere" includes any material to which liquid adheres, unless particularly limited.

Examples of the "material onto which liquid can adhere" include any materials to which liquid can adhere even temporarily, such as paper, thread, fiber, fabric, leather, metal, plastic, glass, wood, and ceramic.

The term "liquid discharge apparatus" may be an apparatus to relatively move the liquid discharge head and the material onto which liquid can adhere. However, the liquid discharge apparatus is not limited to such an apparatus. For example, the liquid discharge apparatus may be a serial head apparatus that moves the liquid discharge head or a line head apparatus that does not move the liquid discharge head.

Examples of the liquid discharge apparatus further include: a treatment liquid applying apparatus that discharges a treatment liquid onto a sheet to apply the treatment liquid to the surface of the sheet, for reforming the surface of the sheet; and an injection granulation apparatus that injects a composition liquid, in which a raw material is dispersed in a solution, through a nozzle to granulate fine particle of the raw material.

The terms "image formation," "recording," "printing," "image printing," and "fabricating" used in the present disclosure may be used synonymously with each other.

Aspects of the present disclosure are, for example, as follows.

Aspect 1

A liquid discharge apparatus includes a first liquid discharge unit, a second liquid discharge unit, a first airflow generator, and a partition plate. The first liquid discharge unit includes a first liquid discharge head that moves in a main scanning direction to discharge a liquid onto a recording medium conveyed in a conveyance direction orthogonal to the main scanning direction. The second liquid discharge unit is disposed at a different position with the first liquid discharge unit in the conveyance direction. The second liquid discharge unit includes a second liquid discharge head that moves in the main scanning direction parallel to the first liquid discharge head to discharge a liquid onto the recording medium. The first airflow generator is disposed between the first liquid discharge unit and the second liquid discharge unit in the conveyance direction. The first airflow generator generates an airflow flowing in the main scanning direction. The partition plate is disposed between the first airflow generator and the second liquid discharge unit in the conveyance direction.

Aspect 2

In the liquid discharge apparatus according to Aspect 1, the partition plate extends in the main scanning direction to separate the first airflow generator from the second liquid discharge unit.

Aspect 3

The liquid discharge apparatus according to Aspect 1 further includes a second airflow generator opposite the first airflow generator across the first liquid discharge unit. The second airflow generator takes in air in the conveyance direction and exhausts the air upward. In other words, the second airflow generator takes air in a first direction from an area around the first liquid discharge unit and exhausts the air in a second direction different from the first direction.

Aspect 4

The liquid discharge apparatus according to Aspect 3 further includes a cover having a top plate and a side plate openably closable to cover the first liquid discharge unit and the second liquid discharge unit. An inner face of a corner at which the top plate and the side plate intersect with each other is chamfered.

As a result, the air exhausted from the second airflow generator flows along the inner face of the cover and circulates to be taken in by the second airflow generator.

Aspect 5

In the liquid discharge apparatus according to any one of Aspects 1 to 4, one of the first liquid discharge unit and the second liquid discharge unit discharges at least one of a pretreatment liquid, a binder, or an overcoat liquid.

Aspect 6

The liquid discharge apparatus according to any one of Aspects 1 to 5 further includes an electrical component unit downstream from the first airflow generator in the main scanning direction in which the airflow from the first airflow generator flows.

Aspect 7

The liquid discharge apparatus according to any one of Aspects 1 to 6 further includes a cover openably closable to cover the first liquid discharge unit and the second liquid discharge unit. The first airflow generator takes in air outside the cover from an upstream of the first airflow generator in the main scanning direction, and exhausts the air outside the cover disposed downstream of the first airflow generator in the main scanning direction.

In other words, an interior of the liquid discharge apparatus communicates with the outside of the liquid discharge apparatus on the upstream and downstream sides in the direction of the airflow generated by the first airflow generator. As a result, the air flows through the full width of the liquid discharge apparatus, Aspect 8

The liquid discharge apparatus according to any one of Aspects 1 to 7 further includes a cover and an elastic sheet. The cover is openably closable to cover the first liquid discharge unit and the second liquid discharge unit. The elastic sheet covers a gap between the partition plate and the cover.

Aspect 9

The liquid discharge apparatus according to Aspect 8 further includes multiple covers including the cover. The partition plate is between one of the multiple covers to cover the first liquid discharge unit and another of the multiple covers to cover the second liquid discharge unit in the conveyance direction.

Aspect 10

In the liquid discharge apparatus according to any one of Aspects 1 to 9, the partition plate is disposed in the full width of a liquid discharge region where the first liquid discharge head and the second liquid discharge head move in the main scanning direction to discharge the liquid.

Aspect 11

The liquid discharge apparatus according to Aspect 1 further includes another first airflow generator opposite the partition plate across the second liquid discharge unit in the conveyance direction. Said another first airflow generator generates an airflow flowing in the main scanning direction.

Aspect 12

The liquid discharge apparatus according to Aspect 3 further includes another second airflow generator between the partition plate and the second liquid discharge unit in the conveyance direction. Said another second airflow generator takes in air in the conveyance direction and exhaust the air upward.

According to one aspect of the present disclosure, liquids discharged from the multiple liquid discharge units are prevented from being mixed.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention.

The invention claimed is:

1. A liquid discharge apparatus comprising:

a first liquid discharger including a first liquid discharge head to move in a main scanning direction to discharge a liquid onto a recording medium conveyed in a conveyance direction orthogonal to the main scanning direction;

a second liquid discharger at a different position with the first liquid discharger in the conveyance direction, the second liquid discharger including a second liquid discharge head to move in the main scanning direction parallel to the first liquid discharge head to discharge a liquid onto the recording medium;

a first airflow generator between the first liquid discharger and the second liquid discharger in the conveyance direction, the first airflow generator to generate an airflow flowing in the main scanning direction;

a partition plate between the first airflow generator and the second liquid discharger in the conveyance direction;

a cover openably closable to cover the first liquid discharge unit and the second liquid discharge unit; and an elastic sheet covering a gap between the partition plate and the cover, the liquid discharge apparatus further comprising multiple covers including the cover, wherein the partition plate is between one of the multiple covers to cover the first liquid discharge unit and another of the multiple covers to cover the second liquid discharge unit in the conveyance direction.

2. The liquid discharge apparatus according to claim 1, wherein the partition plate extends in the main scanning direction to separate the first airflow generator from the second liquid discharger.

3. The liquid discharge apparatus according to claim 1, further comprising:

a second airflow generator opposite the first airflow generator across the first liquid discharger, wherein the second airflow generator takes in air in the conveyance direction and exhausts the air upward.

4. The liquid discharge apparatus according to claim 3, wherein:

the cover includes a top plate and a side plate openably closable to cover the first liquid discharger and the second liquid discharger, and an inner face of a corner at which the top plate and the side plate of the cover intersect with each other is chamfered.

5. The liquid discharge apparatus according to claim 3, further comprising another second airflow generator between the partition plate and the second liquid discharger in the conveyance direction, said another second airflow generator to take in air in the conveyance direction and exhaust the air upward.

6. The liquid discharge apparatus according to claim 1, wherein one of the first liquid discharger and the second liquid discharger discharges at least one of a pretreatment liquid, a binder, or an overcoat liquid.

7. The liquid discharge apparatus according to claim 1, further comprising:

an electrical component downstream from the first airflow generator in the main scanning direction in which the airflow from the first airflow generator flows.

8. The liquid discharge apparatus according to claim 1, wherein the first airflow generator:

takes in air outside the cover from an upstream of the first airflow generator in the main scanning direction; and exhausts the air outside the cover disposed downstream of the first airflow generator in the main scanning direction.

9. The liquid discharge apparatus according to claim 1, wherein the partition plate is disposed in a full width of a liquid discharge region where the first liquid discharge head and the second liquid discharge head move in the main scanning direction to discharge the liquid.

10. The liquid discharge apparatus according to claim 1, further comprising:

another first airflow generator opposite the partition plate across the second liquid discharger in the conveyance direction, said another first airflow generator to generate an airflow flowing in the main scanning direction.

* * * * *